(No Model.)
V. E. SAPP.
PLOW.
No. 549,215. Patented Nov. 5, 1895.
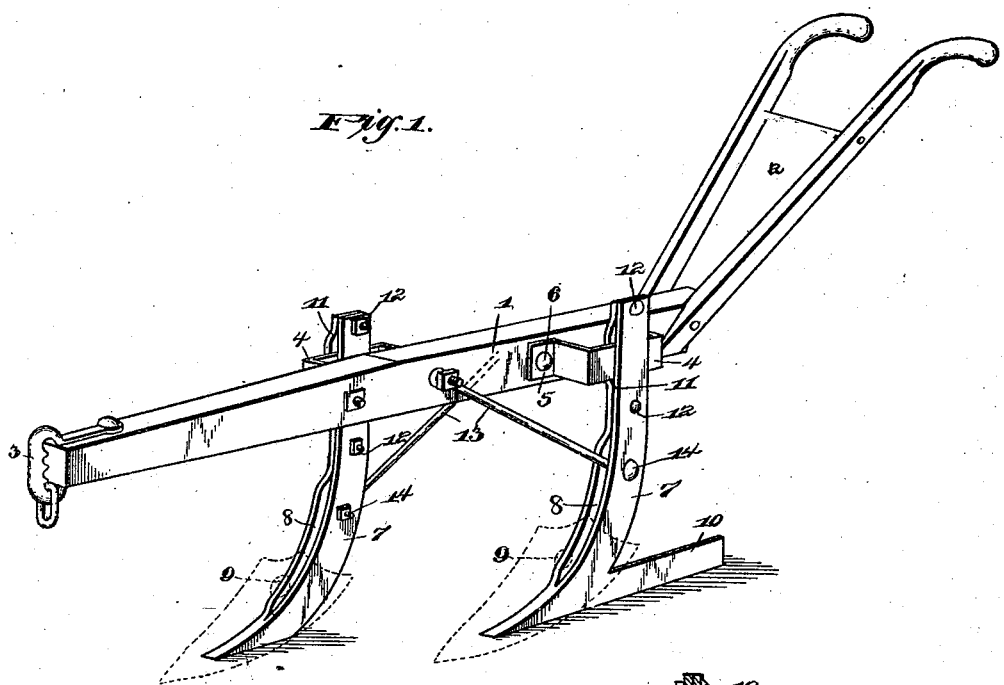
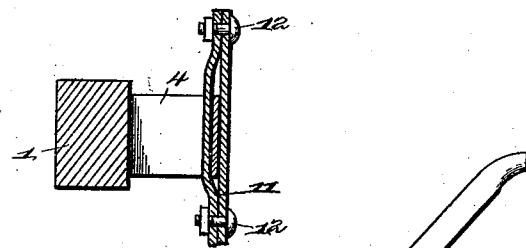
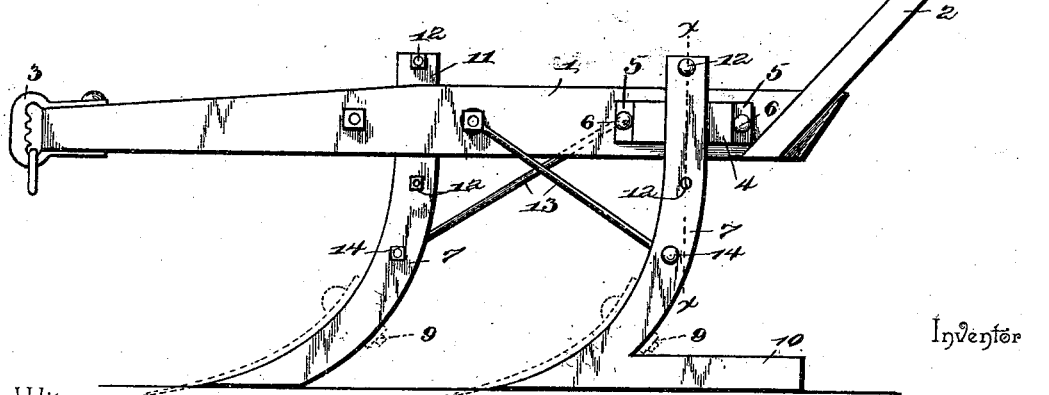
Witnesses
Wm. T. Doyle
D. P. Hathaway
By his Attorneys,
C. A. Snow & Co.
Inventor
Vernon E. Sapp.

UNITED STATES PATENT OFFICE.

VERNON ELI SAPP, OF STARKE, FLORIDA.

PLOW.

SPECIFICATION forming part of Letters Patent No. 549,215, dated November 5, 1895.

Application filed November 14, 1894. Serial No. 528,765. (No model.)

*To all whom it may concern:*

Be it known that I, VERNON ELI SAPP, a citizen of the United States, residing at Starke, in the county of Bradford and State of Florida, have invented a new and useful Plow, of which the following is a specification.

This invention relates to double plows; and it has for its object to provide a new and useful plow of this character employing a pair of standards or feet in connection with a single beam.

To this end the main and primary object of the invention contemplates a light, strong, and durable construction of plow, while at the same time providing a plow the standards or feet of which have all necessary adjustments to adapt the plow for different kinds of work.

With these and other objects in view, which will readily appear as the nature of the invention is better understood, the same consists in the novel construction, combination, and arrangements of parts hereinafter more fully described, illustrated, and claimed.

In the drawings, Figure 1 is a perspective view of a double plow constructed in accordance with this invention. Fig. 2 is a side elevation of the same. Fig. 3 is an enlarged detail sectional view on the line $x\ x$ of Fig. 2.

Referring to the accompanying drawings, 1 designates an ordinary plow-beam of the usual length and shape and which has attached to the rear end thereof the usual pair of plow-handles 2 and to the opposite front ends the clevis 3.

The single plow-beam 1 is adapted to have securely bolted on directly opposite sides thereof the offstanding U-shaped bracket-plates 4, one of which plates is arranged in advance of the other, and both of which are provided with the flanged attaching ends 5, that receive the bolts 6, passing through the plow-beam to secure the said U-shaped bracket-plates in position. The said opposite offstanding U-shaped bracket-plates 4 provide for the support and adjustment of the opposite curved plow standards or feet 7, which by reason of the disposition of the plates 4 are necessarily arranged one in advance of the other to provide a double plow. The said plow standards or feet 7 are provided with the longitudinal slots 8, that receive the bolts 9 for clamping onto the standards or feet any form of plow shovel or blade that it may be desired to use in connection therewith. The rear of said standards or feet 7 is preferably provided with the rearwardly-extending straight heel-bar 10, subserving the usual functions of properly holding the shovels or blades in the ground, and both of said standards or feet 7 are provided at their upper ends with the separate integral clamp-plate portions 11 that embrace the outer vertically-disposed sides of the offstanding U-shaped bracket-plates 4, and said clamp-plate portions 11 receive above and below the said bracket-plates the short clamp-bolts 12, that serve to clamp the standards or feet tightly onto the bracket-plates in any adjusted position. The space between the short clamp-bolts 12 of each standard or foot is slightly greater than the width of the outer vertical sides of said bracket-plates, so as to admit of a vertical adjustment for the standards or feet, while the length of the said vertical outer sides of the bracket-plates is sufficient to provide for an adjustment of the standards or feet longitudinally of the beam, whereby the said standards or feet may be adjusted to suit the requirements of plowing or the height of the person manipulating the plow. The said vertically and longitudinally adjustable plow standards or feet 7 are firmly braced in their adjusted positions by means of the opposite diagonally-arranged brace-rods 13. The diagonally-arranged brace-rods 13 are connected at one end by means of suitable bolts 14 to each plow standard or foot, and the rod connected to the front standard or foot is connected at its rear end to one of the bolts 6 for the rear bracket-plate, while the front end of the opposite brace-rod is connected, preferably, to one of the bolts for the front bracket-plate. This arrangement of the brace-rods 13 provides a very firm bracing for the standards or feet, while at the same time not interfering with any of the adjustments thereof.

Changes in the form, proportion, and the minor details of construction may be resorted to without departing from the principle or sacrificing any of the advantages of this invention.

Having thus described the invention, what is claimed, and desired to be secured by Letters Patent, is—

In a plow, the combination with the beam; of opposite offstanding U-shaped bracket-plates having outer vertical imperforate sides and arranged on opposite sides of the beam one in advance of the other, vertically and forwardly and rearwardly adjustable divided plow standards arranged at opposite sides of the beam and provided at their upper ends with integral separate clamp-plate portions embracing the outer imperforate vertical sides of the bracket plates and having a sliding adjustment lengthwise and crosswise of said vertical sides of the bracket plates, and short clamp bolts connecting said clamp-plate portions of the standards above and below the outer vertical sides of the bracket plates, said clamp bolts being spaced farther apart than the width of the outer vertical sides of the bracket plates to admit of the vertical adjustment of the standards, substantially as set forth.

In testimony that I claim the foregoing as my own I have hereto affixed my signature in the presence of two witnesses.

VERNON ELI SAPP.

Witnesses:
L. B. RHODES,
J. L. VANALER.